United States Patent [19]
Green

[11] Patent Number: 5,452,608
[45] Date of Patent: Sep. 26, 1995

[54] PRESSURE AND TEMPERATURE MONITORING VEHICLE TIRE PROBE WITH RIM ANCHOR MOUNTING

[75] Inventor: Clifford R. Green, Yokine, Australia

[73] Assignee: Topy Industries, Limited, Tokyo, Japan

[21] Appl. No.: 115,558

[22] Filed: Sep. 3, 1993

[30] Foreign Application Priority Data

Sep. 7, 1992 [AU] Australia ................... PL4525

[51] Int. Cl.$^6$ ............................................. B60C 23/04
[52] U.S. Cl. .................................. 73/146.8; 73/146.3
[58] Field of Search .................... 73/146.8, 146.3, 73/146.4, 146.5

[56] References Cited

U.S. PATENT DOCUMENTS 3,303,696  2/1967  Capparelle .......................... 73/146.8
4,254,398  3/1981  Matsuda et al. .................... 73/146.8

Primary Examiner—Herbert Goldstein
Assistant Examiner—Joseph L. Felber
Attorney, Agent, or Firm—Cushman, Darby & Cushman

[57] ABSTRACT

A device for monitoring a vehicle pneumatic tire in-situ on a wheel rim comprising a probe to be sealably mounted to the rim with a hollow stem projecting through the rim into the air cavity of the tire. A temperature sensor mounted in the stem to be exposed to the temperature in the cavity, and the interior of the stem being in use in direct communication with the air cavity. A head at one end of the stem to be external attached to the rim for mounting the probe thereto, and respective conductor extending from the stem through the probe head to project therefrom in a direction generally parallel to the surface of the rim and to convey processable information relating to temperature and pressure conditions within the tire cavity.

The probe head is interlockable with an anchor member secured to the wheel rim.

The probe is used in conjunction with a terminal. The terminal comprises a body to be anchored to the rim with a cylindrical external shaped conductor terminal mounted on the body and presenting at least two coaxial conductor rings insulated from each other. Each conductor ring being connectable to a respective conductor internally of the body and presenting on the periphery of the terminal respect equi-diameter terminal surface.

19 Claims, 5 Drawing Sheets

PRESSURE AND TEMPERATURE MONITORING VEHICLE TIRE PROBE WITH RIM ANCHOR MOUNTING

This invention relates to apparatus for use in the monitoring and controlling of the conditions of vehicle tires such as the temperature and pressure thereof.

In the operation of large vehicles fitted with pneumatic tires, it is important to be able to readily check the operating conditions of the tire, such as by the measurement of the temperature and pressure of the air therein. This monitoring is particularly important in large earthmoving vehicles and other large off-road vehicles which carry heavy loads.

It is desirable to have suitable fitments provided on the wheel rim to enable checking of the temperature and pressure to be carried out quickly and simply. In order to achieve this end, it is necessary to have built into the wheel rim provision for securement of monitoring equipment to carry out such checks. However, because of the physical relationship of the rim to the wheel hub of the vehicle, there are severe dimensional restrictions on the componentry that may be fitted to the rim for the purpose of periodic coupling to pressure and temperature measuring equipment.

It is therefore the object of the present invention to provide monitoring means that can be incorporated into the wheel rim of a pneumatic tired vehicle and will not unduly interfere with the rim or wheel when in assembly, and is relatively secure against damage when the vehicle is in operation and/or whilst being serviced, such as during removal and fitment of the rim to the vehicle wheel.

With this object in view, there is provided according to the present invention, means for monitoring a vehicle pneumatic tire in-situ on a wheel rim comprising a probe means adapted to be sealably mounted to the rim with a hollow stem projecting through the rim into the air cavity of the tire, temperature sensing means mounted in the stem to be exposed to the temperature in the air cavity, the interior of the stem being in use in direct communication with the air cavity, a probe head portion secured to one end of the stem and arranged to be external attached to the rim for mounting the probe means thereto, and respective conductor means extending from the stem through the probe head portion to convey information relating to temperature and pressure conditions within the tire cavity, said conductor means passing outwardly from the head portion in a direction generally parallel to the adjacent surface of the rim.

Conveniently, the probe head is arranged for releasable attachment to the rim for convenient installation or removal for servicing or replacement if required. Preferably, the probe head is adapted to interlock with an anchor member secured to the wheel rim. In one form, the anchor member and probe head are configured so one has a shoulder that is receivable in an aperture in the other when in a specific relative orientation, and when so received, on rotation of one relative to the other an interlocking is achieved. Conveniently, the interlocking is achieved after approximately one quarter revolution from the receivable position.

In one particular application, the probe head is used in conjunction with a terminal means for selectively connecting the conductor means conveying the processable information to external equipment. The terminal means may comprise a body to be anchored to the wheel rim on which the probe head is connected, the body being of cylindrical external shape presenting at least one or two or more coaxial conductor rings insulated from each other. Each conductor ring is connectable to a respective conductor means extending internally of the body, said conductor rings presenting on the periphery of the body respective equi-diameter terminal surfaces separated by insulators of similar diameter.

Conveniently, a removable cap is provided which can be fitted over the terminal means and detachably secured to the body to protect the terminal means, and particularly the conductor rings, when appropriate monitoring equipment is not coupled to the terminal means.

The terminal means body includes a passage extending through the length thereof and through which air can pass, from the air cavity through the probe head to a pressure monitor, when the latter is coupled to the terminal means, to measure and/or record the pressure in a tire fitted to the rim. A conventional tire valve is preferably fitted to the end of the passage remote from the probe head.

In use the terminal means is used in conjunction with the monitoring means as previously referred to, each being mounted on a wheel rim and with each conductor of the probe means secured to a respective ring of the terminal means. As required, an operator can periodically remove the cap from the terminal means and couple suitable information reading and/or storage equipment thereto to check and/or record the temperature and pressure of the air in the tire.

The invention will be more readily understood from the following description of one practical arrangement of the probe means and terminal means as illustrated in and with reference to the accompanying drawings.

Figure 1:
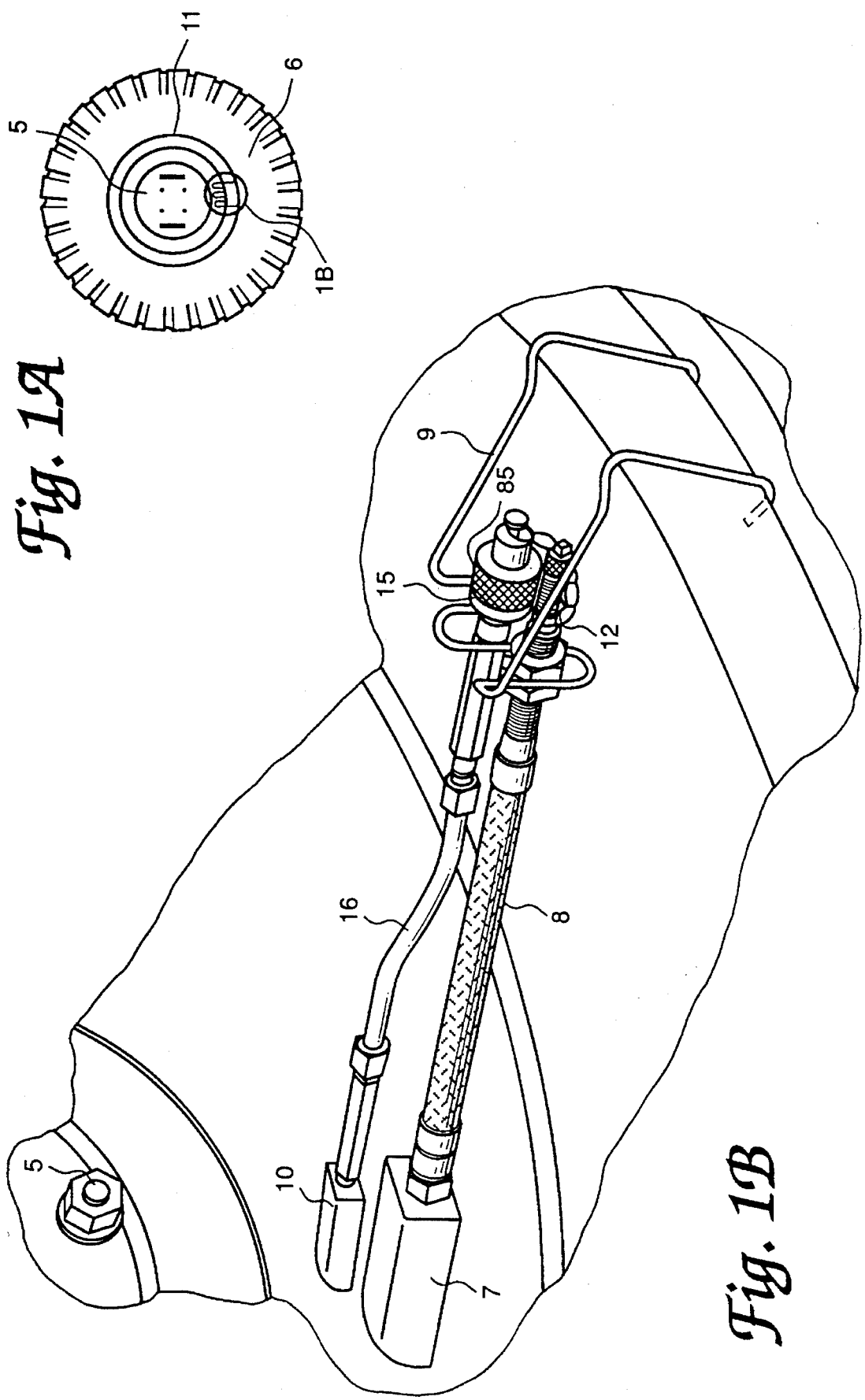
FIG. 1A is a diagrammatic side view of a typical wheel of a heavy earthmoving vehicle with assembled thereto the monitoring and inflation components of the invention.
FIG. 1B is an enlarged perspective view of the portion of the wheel rim circled in FIG. 1A to an enlarged seal.

Referring now to FIGS. 1A and 1B, the rim (11) is mounted on the wheel hub 5 in the known manner and the tire (6) is mounted on the rim (11) in the known manner. Secured to the rim (11) is a tire inflation head (7) connected to an inflation valve extension conduit (8). Also secured to the rim (11) is a probe (10) with a monitor conduit (16) fitted thereto. The remote ends of the inflation conduit (8) and monitor conduit (16) are respectively secured to the anchor clip (9), attached to the edge of the rim (11), by way of the inflation valve (12) and terminal unit (15) secured to the respective conduits. Each of the conduits are made of a suitable tough and/or reinforced material to withstand the harsh conditions that will be experienced when the wheel is in use on a vehicle.

Figure 2:
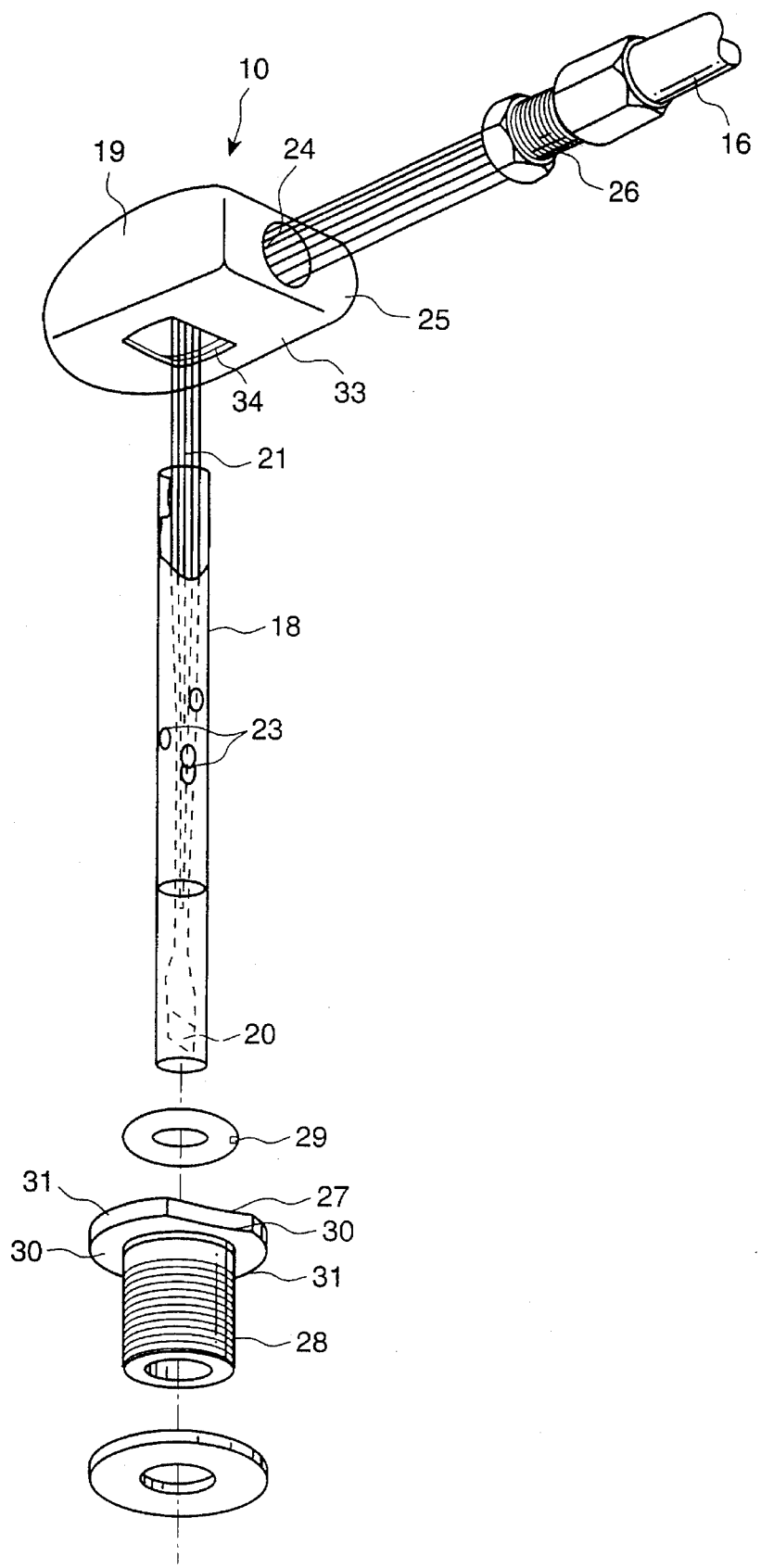
FIG. 2 is an exploded view of the probe.

Referring now to FIG. 2 of the drawings, the probe (10) comprises the stem (18) and a hollow probe head (19), with the upper end of the stem (18) secured in the head (19). The thermistor or other suitable temperature sensor (20) is located in the lower end of the stem (18) and potted within the stem in a known manner. The conventional conductors (21) of the thermistor extend upwardly through the stem (18) into the probe head (19). Above the level of the potting, there are provided a plurality of apertures (23) in the wall of the stem to provide the free passage of air in the tire cavity to enter the interior of the stem (18) and hence free communication into the interior of the probe head (19). The aperture (24) provided in the upright end face (25) of the probe head (19) may be internally threaded to receive a conventional threaded coupling as indicated at (26) to which the conduit (16) can be secured. The conduit (16) provides a shield for the thermistor conductors and a passage for air from the tire cavity.

To secure the probe (10) to the wheel rim (11), the threaded nipple (28) is received in a mating threaded hole in the rim, and the stem (18) is inserted through the nipple with a conventional O-ring seal (29) to be compressed between the nipple (28) and an internal shoulder in the probe head (19). The nipple (28) has a peripheral flange (27) at the upper end having two opposite parallel flat faces (30) connected at the respective ends by arcuate faces (31). The underface (33) of the probe head (19), has a complementary shaped opening (34) therein to receive the flange (27) and configured whereby, a one quarter revolution of the probe head (19), relative to the nipple (28), will provide locked and sealed engagement of the probe to the rim through the nipple (28). The construction of the components to provide this locking action will be described in further detail hereinafter.

It will be noted that the above described construction enables the profile of the probe head (19) to be of a minimum height as the connecting of the probe to the nipple (28) is effected internally of the profile of the probe head (19) and the connection between the probe and the conduit (16) is on a side surface of the probe head.

The construction of the probe head as above described and without the stem (18), is suitable to be used as the inflation head (7) previously referred to for inflating the tire. This is achieved by providing a nipple or "spud" of the form described hereinafter with reference to FIGS. 4 and 5, secured to the rim, preferably at a location adjacent to the probe (10). The tire inflation head is assembled in sealed relation to the spud, in a similar manner to that described with reference to probe (10) and nipple (28), with the inflation conduit (8) sealably secured in an aperture in the end face of the inflation head (7). This inflation conduit extends to adjacent the edge of the rim and may carry a conventional inflation valve such as previously identified at (12) in FIG. 1B for connecting to a source of compressed air to inflate the tire.

This arrangement locates the inflation valve for convenient unhindered access, and provides reduced projection above the rim surface, to simplify assembly of the rim to the wheel hub with reduced risk of damage to the inflation valve. The reduction in height is principally achieved by the nipple or spud 28 being received within the probe head to establish the sealed connection therebetween and so the existence of the nipple or spud does not significantly add to the height of the probe above the surface of the tire rim.

Figure 3:
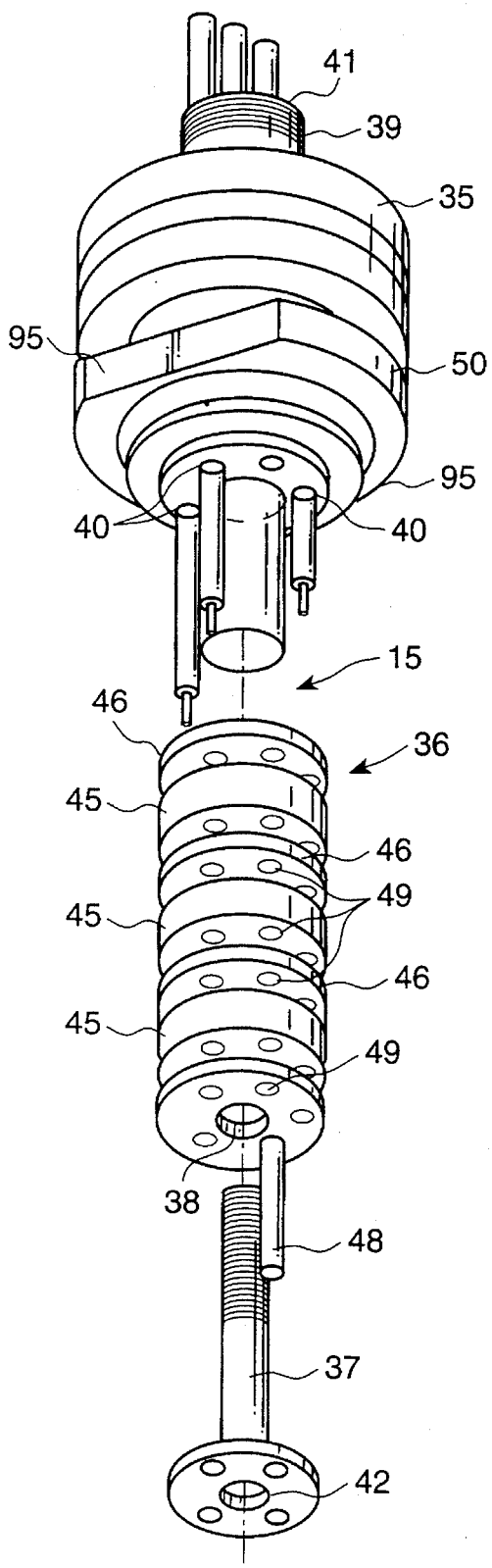
FIG. 3 is an exploded view of the terminal.
Figure 3A:
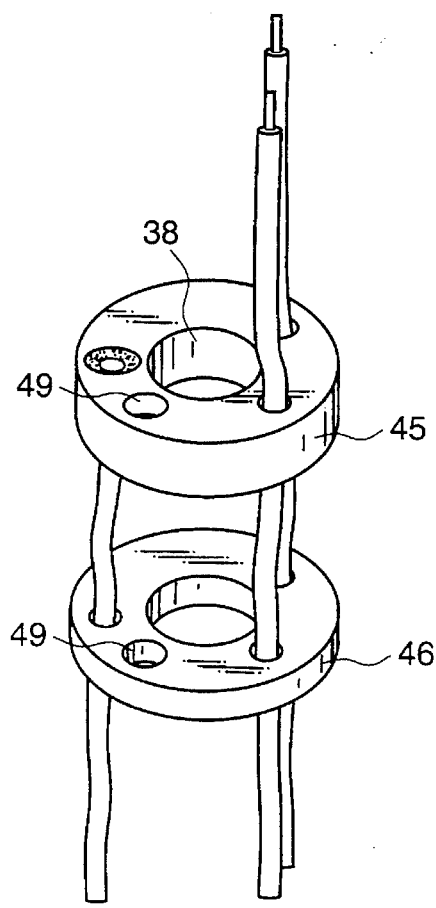
FIG. 3A is a fragmentary view including components of FIG. 3.

Referring now to FIGS. 3 and 3A of the drawings, the terminal unit (15) comprises a body (35), a terminal assembly (36) and a clamp member (37) which extends through the central aperture (38) of the terminal assembly (36) and is threadably received in the body (35). The body (35) has a threaded spigot (39) at the remote end thereof, to which the conduit (16) is secured in use by an appropriate threaded coupling of known construction. The conductors from the thermistor (20) pass through the conduit (16) into respective individual bores (40) provided in the body (35) to permit passing therethrough of the conductors into the terminal assembly (36). The conduit (16) also provides for the free pass for air from the tire cavity through the stem (18) and into the central bore (41) of the body (35) and hence, into the axial passage (42) through the clamp member (37).

The terminal assembly (36), includes three coaxial metallic terminal rings (45) arranged in an axial spaced relationship with an insulation plates (46) between each ring (45) and between the respective end terminal rings and the body (35) and clamp member (37) respectively.

Each of the insulated plates (46) and terminal rings (45) have corresponding arrays of apertures therethrough so that when assembled in a cylindrical stack form, corresponding apertures in each ring (45) and insulator plates (46) align, thereby providing for the free passage of a conductor through the respective aligned series of apertures.

In the configuration as shown, there are three terminal rings (45) and each of the three conductors from the thermistor (20) is terminated at an individual respective ring (45). In addition, each of the rings (45) and insulated plated (46) have a further aperture (49) therein to receive a locating pin (48) of insulating material which, together with the clamp member (42) passing through the central bore of each terminal ring and insulator plate, orientates the terminal ring and insulator plates so that the apertures therein freely receive the conductors and are properly aligned. FIG. 3A shows in greater detail a insulator plate (46) and terminal ring (45) with the three conductors in place. The conductor to the left is terminated and soldered to one of the terminal ring (45) shown, and the other two conductors will be similarly terminated at successive individual terminal rings.

It will be noted that the body (35) has a flange section (50), of a similar configuration to the flange (30) previously described with respect to the nipple (28) and which can co-operate with a similar grooved cavity in a complementary member to interlock with the body (35). One form of the complementary member is a cap (85) as seen in FIG. 1B, that can be fitted over the terminal assembly to protect same when the conditions in the tire are not being checked or examined.

In another form the complementary member, carries resiliently loaded contactors to individually engage the respective terminal rings (45) to thereby provide an electrical connection between the thermistor and measuring and recording equipment to monitor and record the temperature conditions in the tire. That same complementary member can include an aperture to register with the end of the aperture (42) through the clamp member (37) so that the pressure of the air in the tire cavity is also applied to the measuring and recording equipment. In this regard, a one way valve (not shown) is provided in the opening through the clamp member (37) which normally closes the passageway against the outflow of the air from the tire cavity. The valve is opened by the interaction of the coupling member when measurements of the air pressure are to be made. Further details of the coupling member are provided hereinafter with reference to FIG. 8.

The above described construction enables the monitoring of the tire conditions to be carried out conveniently and economically by coupling an appropriate read out and/or recording equipment to the terminal unit (15) to permit an electrical signal indicative of the temperature in the tire cavity to be passed to the equipment, and also to provide for application of the pressure of the air in the tire to the equipment. Also by separating the probe, which provides the initial communication with the air cavity of the tire, from the terminal unit, to which the recording equipment is to be coupled, the probe and terminal unit are individually comparatively small relative to a composite construction thereof, and can be individually located appropriately on the rim (11

) so as to substantially reduce the risk of damage thereto during normal use and servicing of the tires and wheels.

As previously described, the probe is mounted directly on the wheel rim, and a suitable mounting or another bracket or member is provided, secured to the rim, to which the terminal unit can be mounted. The mounting bracket is preferably located so the terminal unit supported thereby is adjacent the peripheral edge of the rim, where it is readily accessible for coupling to the read-out and/or recording equipment.

Figure 4:
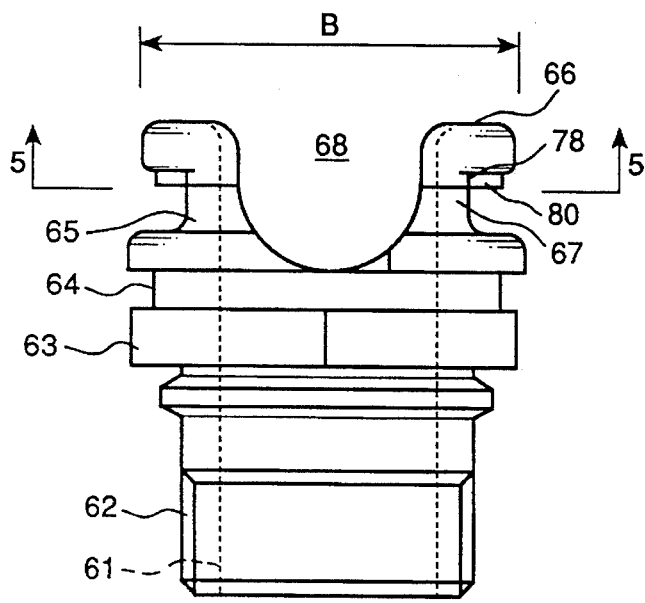
FIG. 4 is a side view of the "spud" or nipple fitting used to attach the probe head to the wheel rim.
Figure 5:
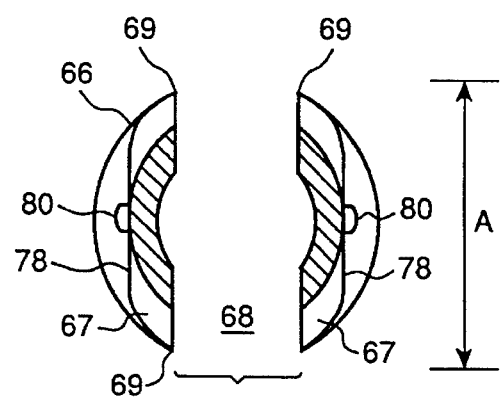
FIG. 5 is a sectional view along line 5—5 in FIG. 4.

The construction of the interfitting coupling between the screwed nipple or spud and the inflation head (7) and probe head (19) respectively, will now be described with reference to FIGS. 4 to 7. Referring firstly to FIGS. 4 and 5, there is illustrated therein a typical form of nipple or spud which is generally of a circular form having an axial passage (61) through the length thereof and being externally threaded at the end of (62) for receipt in a complimentary threaded aperture in the rim (11) or a captive nut located internally of the rim. The passage way (61) may be of a hexagonal cross-section to receive a standard hexagonal key. The portion (63) is a simple flange forming the base of the external annular groove (64) and is dimensioned to receive a standard O-ring seal. The seal will mate with the cylindrical surface (70) of the inflation head (7) when assembled thereto.

Above the groove (64), the body has a reduced external diameter portion (65) and thereabove a larger diameter flange (66) forming an overhanging peripheral shoulder (67). The portions (65) and flange (66) are cut away through the central area as seen at (68) to provide a free path for air with a minimum end clearance between the flange (66) and the opposing internal surface of the inflation head (7). In addition, each end area (69) of the flange (66) is swept inwardly from the true diameter of the flange (66). The total result is that the dimension A is 5 to 6 mm less than the dimension B.

Figure 6:
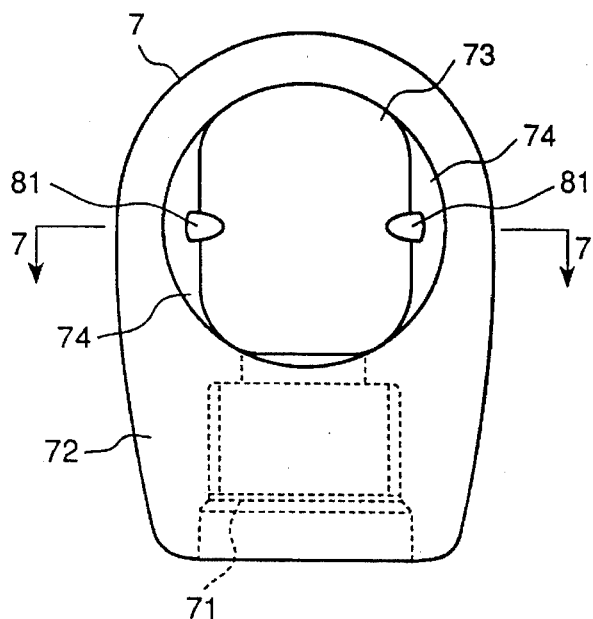
FIG. 6 is an underneath view of the probe, head removed from the wheel rim.
Figure 7:
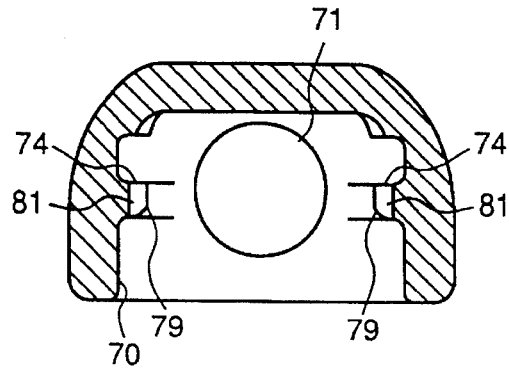
FIG. 7 is a sectional view along line 7—7 in FIG. 6.

Referring now to FIGS. 6 and 7, the inflation head (7) is of a generally hollow construction, having a threaded aperture (71) or other device to receive the connection fitting of the inflation conduit 8. In the underface (72), an opening is provided which forms the cylindrical surface (70) engaged by the O-ring seal previously referred to. The opening (73) has a diameter B+ to provide a slide clearance in respect of the flange (66) of the spud shown in FIG. 4, that is, it is slightly larger in diameter than dimension B. The shoulders (74) formed on the internal surface of the inflation head are spaced apart a distance slightly greater than the dimension A so that the portion (66) of the spud may pass therebetween when in the appropriate relationship to the direction of the shoulders (74).

It will thus be seen that the flange portion (66) can be inserted into the aperture (73) and in a selected orientation pass between the shoulders (74), whereupon relative rotation between the spud and the air inflation head (7) will place the shoulders (67) of the flange in an overlying relationship to the shoulders (74) of the inflation head to thus prevent disengagement thereof when under pressure. It is also to be noted that when in this relative relationship the edge face (78) of the flange (66) will be in an abutting relation with the edge face (79) of the shoulder (74). When in this relation accidental relative rotation between the spud and the inflation head is prevented thereby preventing accidental release of the spud from the inflation head. In addition, a central projection (80) protruding from each face (78) of the spud to be received in respective complementary notches (81) in the shoulders (74) to further prevent accidental rotation between the spud and inflation head.

The form of mechanical interlocking of the spud or nipple to the inflation or probe head as described herein may be used in respect of other components of the mechanisms described herein.

As seen in FIG. 1B of the drawings at 85, a protective cap is provided on the terminal unit 15 as having regard to the acute conditions as to which a vehicle wheel is exposed, it is necessary to protect the internals of the terminal unit and the external surface thereof wherein the insulation plates 46 and the terminal rings 45 are located. Although the provision of a suitable cap would normally be a simple task, a particular problem arises in respect of such a cap for fitment to the terminal unit on the rim of the wheel.

The problem is that the cap must be effectively sealed against the entry of moisture or fine dust particles and thus, is normally provided with a suitable form of resilient seal such as an O ring. However, the providing of such an effective seal also results in preventing the escape of air from within the cap which may leak from the air cavity within the tire. Over a period of time, the pressure of the air in the cap can rise to a significant level above atmospheric and may therefore render it difficult for manual removal of the cap when access is required to the terminal unit. Also, there is the potential of danger to the operator removing the cap in that, upon release of the cap from the terminal unit body, the air pressure may propel the cap in a manner which will release it from the grip of the operator and provide the potential for injury to the operator or other persons in the vicinity.

Figure 8:
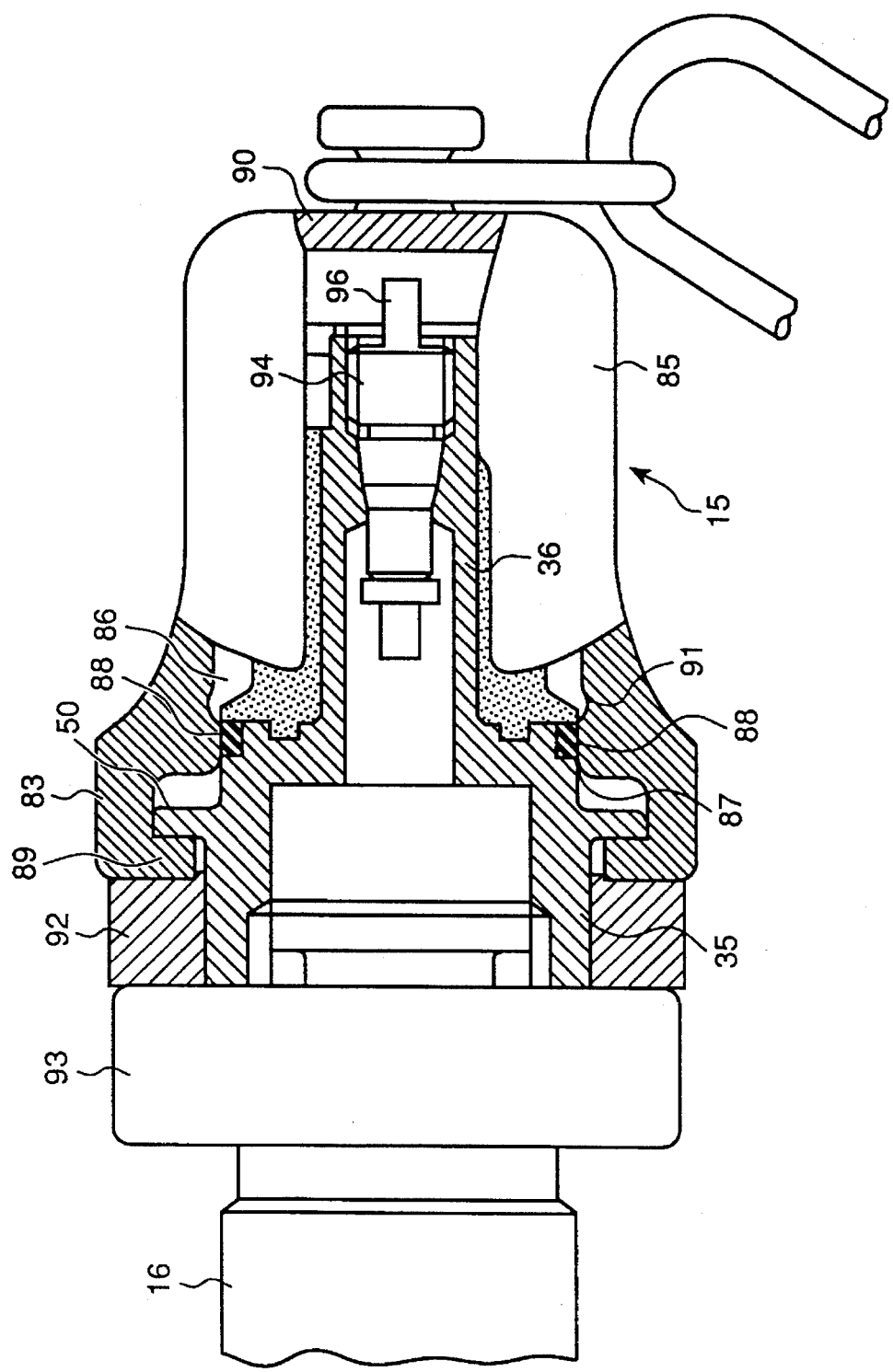
FIG. 8 is a partially sectioned view of the terminal means with a cap fitted thereto.

There is illustrated in FIG. 8, a cap fitted to the terminal unit constructed to enable release of air pressure within the cap prior to release of the cap from the terminal unit thereby simplifying the release of the cap from the terminal unit and reducing the risk of possible injury to people in the vicinity by the propulsion of the cap during release as above referred to.

As seen in FIG. 8, the cap 85 is of a one piece hollow sleeve-like construction closed at one end 90 to defining an internal cavity 86 to receive the terminal assembly portion 36 of the terminal unit 15, and having open opposite end, an enlarged open end portion 83 with opposed inwardly projecting flange 89. As seen in FIG. 3, the body 35 of the terminal unit 15 includes an external flange 50 based on a circular shape with two opposite flat edge surfaces 95. The inwardly projecting flange portion 89 of the cap 85 is of a complementary internal shape to the external flange 50 of the terminal unit 15 to thereby form inter-engageable male and female elements. These complementary configured flange portions will interfit when the flat faces of the cap are aligned with the flat faces of the body of the terminal unit, and the two components will interlock upon rotation of the cap relative to the terminal unit through 90° whereby the inwardly projecting flange portions 89 of the cap are positioned behind the externally projecting portions of the flange 50 of the body 35 as shown in FIG. 8.

The body of the terminal unit has a conventional O ring 87, seated in a peripheral groove therein, to cooperate with the internal circular ridge 88 on the cap 85, thereby establishing an effective seal against the entry of moisture or dust to the cavity 86 of cap. Immediately adjacent the ridge 88 is an annular groove 91 having an internal diameter greater than that of the O ring 87 when in a free state. Thus, by axially displacing the cap 85 to the left as seen in FIG. 8, the sealed relationship between the O ring and the ridge 88 is broken as the O ring 87 is then located in the groove 91, thereby permitting the air in the cap to escape to atmosphere, if there has been a pressure build up in the cap whilst in assembly with the terminal body. Thereafter the cap can be rotated to release it from the terminal body.

In order to normally maintain the cap in the position where the ridge 88 is in sealing contact with the O ring 87, the compression ring 92 is provided between the flange 93 of the terminal body 35 and the flange 89 of the cap. The compression ring 92 is of rubber or like resilient material and is in a compressed state in the axial direction when the cap 85 is assembled to the terminal body as seen in FIG. 8. The force generated by the compressed state of the ring 92 maintains the cap 85 in the position where the O ring 87 is in sealing engagement with the internal ridge 88 of the cap. It will be appreciated that in use the pressure of the air within the cavity 86 will also complement the force provided by the ring 92 to maintain the cap in the sealed relation to the O ring 87. Axial displacement of the cap to locate the O ring 87 in the annular groove 91 is effected by further compression of the compression ring 92.

It will be appreciated that it is not necessary to displace the complete cap to release the pressure, but by merely tilting the cap, a portion of the ridge is displaced from contact with the O ring and so portion of the O ring enters the groove 91 to thereby permit escape of air from within the cap, and subsequent removal of the cap.

The above described construction of the cap 85 can also be used for a coupling device to operatably connect the terminal unit 15 to an appropriate read-out or recording equipment. Such a coupling device would be configured to provide an internal cavity to receive the terminal unit 15, and be provided with an inwardly projecting flange, of the same construction as the flange 89 of the cap 85, to releasably interlock with the external flange 50 of the body 35. Also, contact pins would be provided, protruding inwardly from the inner wall of the cavity to engage the respective terminal rings 45 of the terminal unit 15. Suitable insulated electrical conductors are secured to the contact pins and extend outwardly from the coupling device to connect with read-out or recording equipment.

Also, a hollow projection is provided in the end of the coupling device, corresponding to the end wall 90 of the cap 85, to co-operate with the air valve 94 to open same and to provide sealed communication between the valve and the read-out or recording equipment. The air valve 94 is of conventional construction, normally held closed by the air pressure in the tire and having a pin (not shown) that can be depressed to open the valve and allow air to pass into the read-out or recording equipment.

The seal between the coupling device and the air valve is provided by an O ring fitted in the coupling device to receive the projecting end portion 96 of the valve 94. In view of the sealed connection it is not necessary for the coupling device to sealably engage the O ring 87 provided in the terminal unit 15 due to the seal established by the O ring in the coupling engaging the projection 96 on the valve 94.

I claim:

1. A pneumatic tire monitoring probe mounted on a wheel rim of a tire for monitoring a tire temperature and for conveying an internal pressure of the tire to a pressure sensor device, the probe comprising:

a terminal unit adapted to be connected to the pressure sensor device;

a conduit connected at a first end thereof to said terminal unit;

a probe head connected to and in communication with a second end of said conduit;

a hollow stem extending from said probe head, said stem having at least one opening formed in a peripheral surface thereof and an open end distal to said probe head, wherein an interior of said stem is in series fluid communication with said probe head, said conduit, and said terminal unit;

at least one lead connected to said terminal unit and threadedly extending through said conduit, said probe head, and said hollow stem; and a temperature sensor connected to said at least one lead.

2. A monitoring probe as claimed in claim 1, further including an anchor member for attaching the monitoring probe to a rim of the tire, wherein said probe head is detachably mounted to the anchor member.

3. A monitoring probe as claimed in claim 2, wherein said probe head and said anchor member inter-fit when in a first relative disposition, and inter-engage upon relative rotation therebetween from said first relative disposition to a second relative disposition.

4. A monitoring probe as claimed in claim 3, wherein said probe head and said anchor member releasably interlock when in said second relative disposition.

5. A monitoring probe as claimed in claim 4, wherein said probe head is rotated through approximately 90° between said first and second relative disposition.

6. A monitoring probe as claimed in claim 5, wherein one of said probe head and said anchor member is provided with a projection and the other of said probe head and said anchor member is provided with a recess, said projection and recess being positioned and dimensioned to interlock when said probe head and anchor member are in said second relative position.

7. A monitoring probe as claimed in claim 6, wherein when said probe head and said anchor member are inter-engaged, adjacent surfaces of said probe head and tire rim are adjacent proximity.

8. A monitor probe as claimed in claim 4, wherein said terminal unit includes a cylindrical body with at least one conductive ring connected to said at least one lead.

9. A monitor probe as claimed in claim 8 having two or more said conductive rings insulated from each other, each said conductive ring being connected to a respective said lead.

10. A monitor probe as claimed in claim 9, wherein each said lead extends into one end of said cylindrical body and is connected to a respective said conductive ring at an interior portion of said cylindrical body, said conductive rings having, on the peripheral surface of said cylindrical body, respective terminal surfaces.

11. A monitoring probe as claimed in claim 10, wherein said cylindrical body has a passage extending in an axial direction therethrough to communicate with an interior of said probe head, said passage having a valve at an end of said passage distal to said probe head.

12. A monitor probe as claimed in claim 11, further including a detachable cover fitted on said terminal unit and enclosing said conductive rings.

13. A monitor probe as claimed in claim 12, wherein said cover is a cap, wherein said cap and said cylindrical body of said terminal unit sealably inter-engage when said cap is fitted, wherein said cap is manually manipulable to break said sealing engagement prior to removal of said cap from said cylindrical body.

14. A monitor probe as claimed in claim 13, wherein the cap and body sealably inter-engage with the cap in a concentric relation with the body, said sealing engagement being breakable upon deflection of said cap from said concentric relation.

15. A monitor probe as claimed in claim 14, wherein said cap and said cylindrical body inter-fit when in a first relative concentric relation and lockably inter-engage upon relative rotation therebetween from said first concentric relation to a second concentric relation.

16. A monitor probe as claimed in claim 15, including resilient means for urging said cap into sealing engagement with said cylindrical body when said body and said cap are in said locked inter-engagement, said resilient means being deflectable to permit said deflection of said cap to break said sealing engagement.

17. A monitor probe as claimed in claim 1, further comprising an anchor member for mounting the probe to a tire, wherein said probe head and anchor member inter-fit when in a first relative disposition, and inter-engage upon relative rotation therebetween from said first relative disposition to a second relative disposition, said probe head being connectable to a compressed air supply whereby probe head and said anchor member together define a passage through which compressed air is conveyed to an air cavity of the tire.

18. A monitor probe as claimed in claim 17, wherein said probe head and said anchor member releasably interlock when in said second relative disposition.

19. A monitor probe as claimed in claim 18, wherein said probe head is rotated through approximately 90° between said first and second relative positions.

* * * * *